United States Patent [19]

Schade

[11] Patent Number: 4,842,744
[45] Date of Patent: Jun. 27, 1989

[54] METHOD FOR CONTINUOUS FILTRATION OF FLUIDS

[76] Inventor: Horst Schade, In der Marpe 16, 4320 Hattingen, Fed. Rep. of Germany

[21] Appl. No.: 193,349

[22] Filed: May 12, 1988

[30] Foreign Application Priority Data

May 14, 1987 [EP] European Pat. Off. ........ 87106976.1

[51] Int. Cl.⁴ ..................... B01D 33/00; B01D 35/16; B01D 35/30
[52] U.S. Cl. .................................... 210/636; 210/676; 210/337; 210/792; 210/796; 55/181; 55/390
[58] Field of Search ............... 210/636, 650, 651, 652, 210/676, 696, 772, 792, 796, 791, 780, 256, 297, 298, 337, 338, 797; 55/34, 96, 98, 99, 181, 390

[56] References Cited

U.S. PATENT DOCUMENTS

| | | | |
|---|---|---|---|
| 4,203,736 | 5/1980 | Berz | 55/96 |
| 4,360,364 | 11/1982 | Kohl | 55/98 |
| 4,751,003 | 6/1988 | Raehse et al. | 210/651 |

Primary Examiner—Frank Spear
Assistant Examiner—Joseph Drodge
Attorney, Agent, or Firm—Clifford A. Poff; Thomas H. Murray

[57] ABSTRACT

By this method, the fluid to be filtered is led through a filter bed formed of particulate filter particles, such as sand, which filter bed is retained in an upstanding annular space. The fluid is introduced to the interior part 15 of the annular space and is led transversely to the movement the filter bed, through it and away. The filter bed is provided on the inner wall of annular space with a microfilter, such as sieve grid 16, with a mesh size of 10 to 200 microns, whereby the heavy and flocculated dirt particles settling upon the microfilter are led down and away and are drawn off together with the particulate filter particles 32. To avoid stoppages of the microfilter, it is flowingly hydraulically cleaned from the inner space. Additionally, by introduction of water in the take-off space 11 there is produced a vortex bed, whereby at this space the withdrawal of the particulate filter medium is effected with a mammoth pump 17 known per se. The compressed air for the operation of the mammoth pump 17 is supplied not steadily but pulsatingly. Thus, there are provided in the vortex bed in combination with the water supply thereto some hydraulic pulses which serve to hinder the development of bridges in and above it.

16 Claims, 3 Drawing Sheets

METHOD FOR CONTINUOUS FILTRATION OF FLUIDS

BACKGROUND OF THE INVENTION

1. Field of the Invention:

This invention relates to a method for the continuous filtration of fluids, and especially for the cleaning of fluids such as drain water or the like. In the method of the invention, there is used a filter bed consisting of a particulate material, such as sand. The particulate material is moved downwardly in an upright-standing cylindrical annular container that is bounded by fluid-permeable walls, and is circulated, being withdrawn from the bottom, regenerated, and returned to the top. In the method of the invention, the liquid to be filtered is led into the inner part of the annular container bounded by the fluid-permeable walls, and it is led transversely to the movement of the filter bed throughout its entire height. The invention further relates to the apparatus for performing the method of the invention.

2. Description of the prior art:

The methods and apparatus hitherto known or used for the continuous filtering of fluids are, on various grounds, not satisfactory.

An ideal plant for a continuous filtration process requires, among other things, an uninterrupted introduction of the liquid to be filtered into the filter bed. With the known apparatus, the introduction is usually performed through fluid-permeable walls such as jalousies, sieve grids, or the like, which become plugged relatively rapidly.

There is also known an apparatus, one in which good cleaning is obtained by the introduction of a step of microfiltration, but in such a process, instances of plugging develop because of the flocculation of impurity particles in the liquid to be filtered.

Ideally, in a continuous filtration process, the bed consisting of particulate filter-media particles also flows regularly. In the processes hitherto known, however, there are often developed irregularities in the flow movement filter-media particles which lead to the development of preferred flow streams, or narrow areas can form an unwanted bridge, which likewise leads to unwanted blockages in the filtering operation. To obtain a flow of particulate filter-media particles as regular as possible, it is known to use apparatus that contains in the region of the flow paths at various places a number of radial guide vanes, with the use of which a certain degree of improvement is obtained. Nevertheless, even with the use of such measures, irregularities occur in the movement of the filter particles and the filtering action is less than ideal.

In connection with methods and apparatus of the type indicated above, it is also already known that it is advantageous to produce a vortex or whirling bed in a lower conical part of the apparatus, a part from which the particulate filter-media particles are withdrawn and led away to the upper side of the filter bed for regeneration. This can be done, in a manner already known per se, by the introduction of water into the conical part.

For drawing off the particulate-media particles, there has been regularly used a mammoth pump (compressed-air lifting device) of a kind which is already known per se. In accordance with known practices, the air pressure for this pump has been supplied steadily, rather then in pulses.

SUMMARY OF THE INVENTION

About the method according to the invention, the fluid to be filtered is led through a filter bed which is formed of particulate filter particles, such as sand, which filter bed is retained in an upstanding annular container. The fluid to be filtered is introduced into the interior part of the annular container and is led, transversely to the movement of the filter bed, through it and away. The filter bed is provided on the inner wall of the annular container with a microfilter, such as a sieve grid, having a mesh size of 10 to 200 microns, whereby the heavy flocculated impurity particles settling upon the microfilter are led down and away, and are drawn off, together with the particulate filter-media particles. To avoid stoppages of the microfilter, it is cleaned by blasts of water directed against it. Additionally, according to the method of the invention, water is introduced into the conical bottom (take-off) portion of the particulate filter-media bed, to produce a whirling or vortex action therein. Moreover, in accordance with the invention, the compressed air for the operation for the compressed-air lifting device which removes the filter-medium particles from the above-mentioned take-off space and returns them to the top of the filter bed is supplied pulsatingly, rather than steadily. The use of the combination of conditions inhibits or prevents the development of bridges or preferred flow paths in the above-mentioned conical region and above it and also counter-acts the other irregularities in flow which may develop because of heavy impurity particles deposited upon the microfilter.

DESCRIPTION OF THE DRAWINGS

A complete understanding of the invention may be obtained from the foregoing and the following description thereof, taken in conjunction with the appended drawings, in which.

DESCRIPTION OF THE PREFERRED EMBODIMENTS

Figure 1:
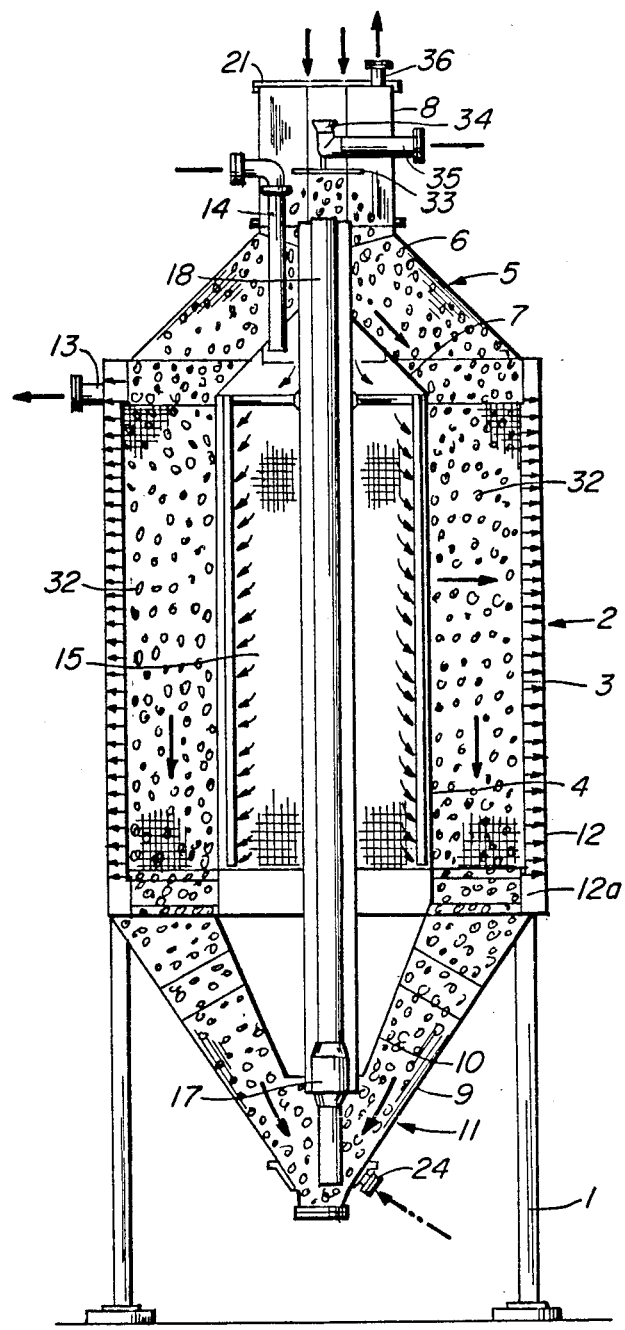
FIG. 1 is a vertical section of an apparatus according to the invention.
Figure 2:
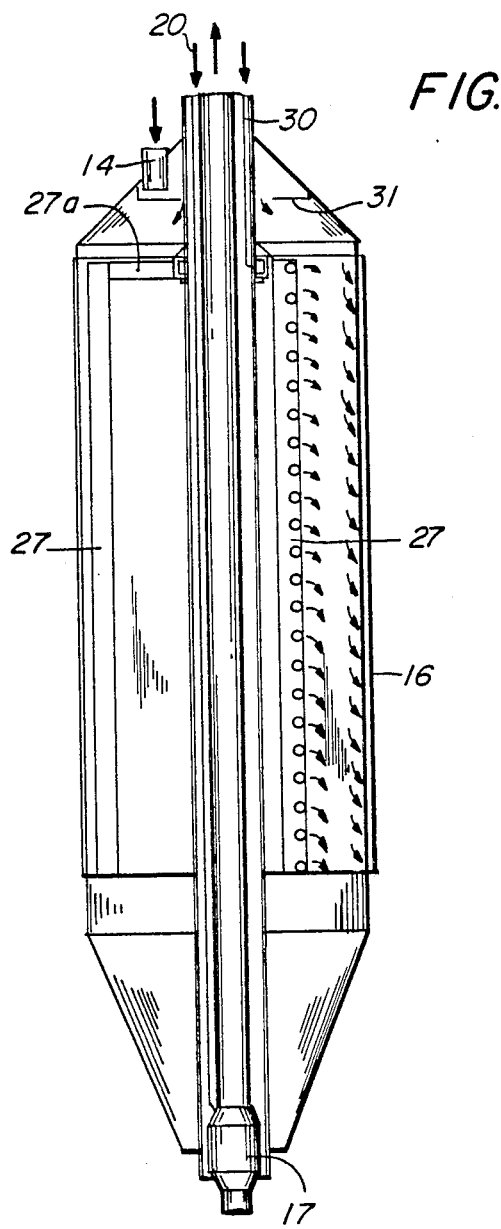
FIG. 2 is a vertical section of the inner ring space of apparatus according to the invention, together with a hydraulic nozzle system, on an enlarged scale.
Figure 3:
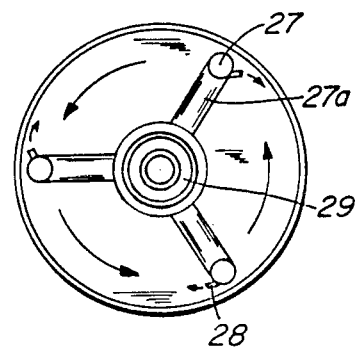
FIG. 3 is a cross section in the region of the above-mentioned inner space of the apparatus in the plane of the line I—I of FIG. 2.

Starting with a method which is generally of the kind described above as constituting the prior art, the problem of obtaining an improved filtration is solved, according to the invention by providing on the inner wall of a cylindrical annular space a microfilter, for example, a sieve grid with a mesh width of 10 to 200 microns, with the heavy enflocculated impurity particles depositing themselves on the microfilter being led away downwardly and into a conicalshaped part in the filter bed, and with the microfilter being cleaned by hydraulic flow from the inner space.

Moreover, according to an important thought in accordance with the present invention, there is provided a microfilter which functions as a pre-filter for the filter bed, with means and a means for washing off the impurity particles collected in the microfilter through a steady hydraulic cleaning action on the wall of the microfilter, and with the particles then being led to a removal area. Advantageously, the cleaning action is provided with streams of water that enter onto the entire height of the microfilter, issuing from rotating nozzles. Moreover, in accordance with the invention, accordance with the present invention, there is provided a microfilter which functions as a pre-filter for the filter bed, with means and a means for washing off the impurity particles collected in the microfilter through a steady hydraulic cleaning action on the wall of the microfilter, and with the particles then being led to a removal area. Advantageously, the cleaning action is provide with streams of water that enter onto the entire height of the microfilter, issuing from rotating nozzles. Moreover, in accordance with invention, compressed air is supplied through a compressed-air lifting device pulsatingly, rather than steadily, and this, in combination with the other measures indicated above, produces in the space from which the filter particles are withdrawn and above it an action which substantially diminishes or prevents the development of bridges or unwanted preferred flow paths. By regulating the supply of water through ring nozzles, there can be produced in the withdrawal space a whirling bed, which makes possible a regulated withdrawal particulate filter-media particles, according to the intensity of the water and in accordance with the pulse frequency of the compressed-air lifting device.

The apparatus shown as a working example has, in general, the form of an upstanding cylindrical container which rests upon supports 1. The principal component of the container is an annular container portion 2 having a cylindrical outer wall 3 and a coaxial inner cylindrical wall 4. A conical head piece 5 sits on the upper side of the annular container portion 2, wherein the head piece is formed of the two conical walls 6 and 7. On the outer conical wall 6, there rests on its upper end a cylindrical cap 8.

At its lower end, the annular container portion 2 likewise merges into a lower conical part 11 which is formed of two conical walls 9 and 10.

The walls 3 and 4 of the annular container portion are formed to be fluid-pervious. The may consist, for example, of perforated metal sheets. The annular portion 2 is surrounded by a casing 12, which has a radial separation from the wall 3, so that there is provided a free annular space which is closed from above and below. At the upper end of the annular container section 2, there is provided in the casing 12 an outlet means 13, from which the filtered fluid may be withdrawn. The fluid to be cleaned is introduced by means of the tube 14 into the interior 15 of the annular container portion 2.

A sieve grid 16 with a mesh width of 10 to 200 microns bears upon the inner fluid-permeable wall on its inner casing face and throughout its entire axial height. The wall 4 thereby serves for holding and supporting the sieve grid 16. In place of the sieve grid, there can also be used any other construction which is suited for acting as a micro filter.

In the center of the apparatus, there is located a mammoth pump (compressed-air lifting device) 17, which extends from the upper cap 8 all the way into the lower conical-shaped withdrawal space 11. Details about the construction of the pump 17 appear in FIG. 4. Accordingly, the pump 17 contains an inner suction tube 18 and a concentric outer tube 19. In the intermediate space between these two tubes, there runs a tube 20 that serves for the supply of compressed air, which may be supplied with a pressure, for example, of 3 bar. The exterior connection of this tube 20 is located on the exterior of the lid 21 of the cap 8.

At its lower end, the pump 17 forms a concentric inlet tube 22, into which the particulate filter-media particles are sucked by the suction derived from operating the pump and from there, the filter particles are transported with the air of the supplied compressed air through the tube 18 and into the cap 8.

For the production of a vortex or whirling bed in the withdrawal space 11, there is arranged a ring nozzle system on the outer conical wall 9. A significant component of this ring nozzle system is a surrounding canal 23, into which there flows a connected support 24 for the supply of water. In the region of the canal 23, extending through the conical wall along its entire periphery a number of bores 25, through which the supplied fluid enters into the withdrawal space 11.

Figure 4:
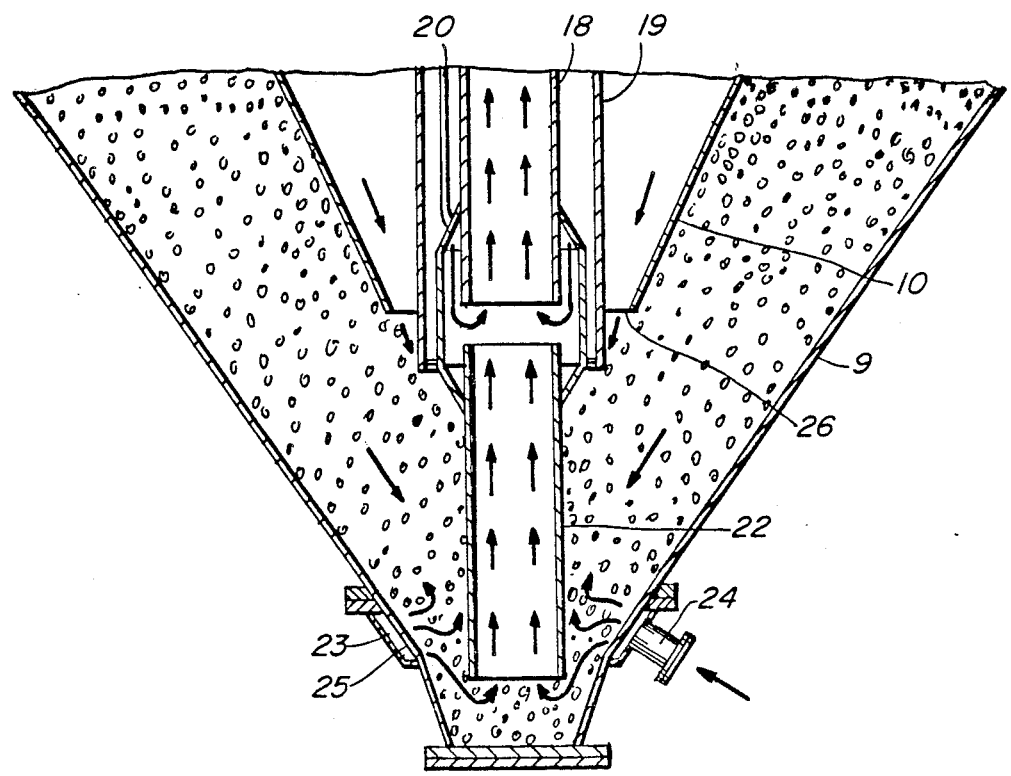
FIG. 4 is a vertical section in the conical withdrawal space of the above-mentioned apparatus, of an enlarged scale.

FIG. 4 shows, an open ring 26 is formed at the lower end of the inner conical wall 10, between it and the tube 19. Through the ring 26, there may be passed the dirt particles coming down from above from the withdrawal space 11. In order to ensure an undisturbed flowing movement of the particles, the inner conical wall has a slope of at least 60 degrees.

In order to be able to entirely remove any impurities on the sieve grid 16, there is provided on the inner space 15 on the annular container part 2 a hydraulic cleaning system. This consists principally of three equally spaced tubes 27 arranged parallel to the axis, which tubes are connected at their upper end to a rotatable star-fixture 27A. Each of the tubes 27 runs in a generally parallel relationship with the sieve grid 16 and contains a number of exit nozzles 28. The nozzles 28, with their small angle with respect to the tangent, are directed with their exit ends facing the casing surface of the sieve grid 16. The hub 29 of the star fixture 27A, which serves for rotatory positioning, contains also a ring channel, to which on one side the tube 27 and on the other side the tube 30 are connected for the supply of rinse water. The pressure of the rinse water will be chosen according to the requirements; and can be, for example, about 6 bar. When rinse water is led to the hydraulic cleaning system a reactive effect works upon the nozzles to produce an automatic and regular turning of the tube 27, whereby a continuous and regular spraying of the sieve grid 16 is obtained.

In the operation of the apparatus, the fluid to be filtered is led by the tube 14 and a perforated supply fixture 31 to the inner space 15, and is regularly divided over its cross section. From the inner space 15, it flows through the sieve grid 16 into the adjacent annular space, which is filled with particular filter-media particles 32, and from there, it flows further into the exterior ring space 12A, from which the filtered fluid exits through the exit fixture 13. The heavy and flocculated impurity particles sink in the inner space 15 to below the ring space 26, through which they are drawn off into the downwardly flowing filter bed. The flow movement of the filter bed is effected by the operation of the pump 17. The supply of the compressed air is supplied pulsatingly. In connection with the water supply through the pieces 24 to produce a vortex in the withdrawal space 11, hydraulic pulses are produced thereby which counteract the development of bridges in this region. For regulation of the pulse frequency, the pulsatingly supplied compressed air and the intensity of the water supply through the ring-nozzle system 23-25 may be controlled in accordance with the withdrawal of particulate filter-media particles in a desired manner.

The regeneration of the particulate filter-media particles, for example, sand, is effected with water and air while passing through the pump. The division of the particulate particle, which may have particle dimensions of, for example, 0.4 to 1 millimeter, from the wash water takes place in the cap 8, because of the differing rates of settling. The division or separation of the supplied filter particles across the cross section of the cap 8 is effected with the aid of a baffle plate 33, while the wash-water mixture is led downwardly over the conical-shaped upper ring 34 and its connected fixture 35. The blast air is removed in the head of the cap by the pressure filter apparatus by means of a swimmer valve through a tube 36 and by the siphon-like operation of the apparatus through a vacuum pump or through the tube 36, so that the water level is maintained above the overflow cone 34. The amount of wash water removed corresponds in an amount to the transported wash water supplied by the pump 17. Insofar as a regulation of this amount is necessary, this can be done mechanically by positioning of the withdrawal tube 35. The amount corresponds to about 2 to 5 percent by weight, based upon the filter water.

While there has been shown and described herein a certain embodiment of the invention, it is intended that there be covered as well as any change or modification therein which may be made without departing from its spirit and scope.

I claim:

1. In a method for the continuous filtration of liquids, the steps of introducing a liquid to be filtered into a filtration apparatus, passing the liquid downwardly into a central receiving area of the apparatus, from said central area passing the liquid through an upstanding liquid-permeable wall having a microfilter, wherein said microfilter includes an inner filtering face thereafter passing the liquid transversely through an upstanding filter bed of substantial height consisting of particulate filter-media particles arranged outwardly of said wall, continuously moving the filter particles downwardly during the passage of the liquid, causing the filtered fluid to be withdrawn from the apparatus from an area outward of said filter bed, collecting the filter particles at the bottom of said filter bed and then drawing off and transporting the particles inwardly of said wall to the top of said filter bed for recirculation downwardly through the apparatus, during the collection introducing a liquid into the filter particles to produce a vortex action on the moving particles, and simultaneously with the filtration applying a removing liquid to said microfilter to cause a removal of the relatively heavy and fluctuated impurity particles deposited on said microfilter and simultaneously causing the removing liquid to carry said impurity particles to the bottom of said filter bed.

2. In a method according to claim 1, an additional method step of applying the liquid over substantially the entire inner filtering face of said microfilter in a manner to cause a removal of the deposited particles.

3. In a method according to claim 2, wherein said applied liquid takes the form of a spray created by a rotating nozzle.

4. In a method according to claim 2, the additional steps of causing the impurity particles to be directed to a conically shaped part, thereafter drawing off the filter particles from said conically shaped part by a pump, and creating a pulsating bed by introduction of the liquid into said conical shaped part.

5. In a method according to claim 4, wherein said drawing off step is preformed by a mammoth pump.

6. In a method according to claim 4, wherein said drawing off step is preformed by a compressed air lifting device.

7. In a method according to claim 4, the additional step of subjecting said drawing off action to the action of a sloped surface of said conical shaped part of at least 60 degrees.

8. In a method according. to claim 2, wherein the amount of water required to create said vortex is caused by the water used for the removal of the impurity particles and the transporting of the filter particles.

9. In a method according to claim 1, wherein said microfiltering step comprising passing the liquid to be filtered through a mesh of 10 to 200 microns.

10. A method for the continuous filtration of a liquid effluent, comprising the steps of:
supplying the effluent to a top end of an enclosed, upstanding container, said container being divided into an inner cylindrical section and an outer-annular section by a permeable coaxial inner cylindrical wall;
forming a continuously recirculating filter bed in the outer-annular section of the container, said filter bed comprised of particulate filter particles supplied to a top end of the outer-annular section, said filter particles allowed to fall through the outer-annular section to be then recirculated to the top end of the outer-annular section;
positioning a microfilter means to extend about and to be supported by the permeable coaxial inner cylindrical wall, said microfilter means having a mesh width of ten to two hundred microns, wherein said microfilter means filters the effluent of floucculated impurity particles, and allows the effluent to pass through the permeable coaxial inner cylindrical wall and transversely to the outer-annular section with the recirculating filter bed formed thereat to be further filtered thereby;
cleaning said microfilter by supplying a pressurized cleaning fluid to rotary nozzles supported at a top end of the inner cylindrical section, said rotary nozzles having lengths to extend along the height of the microfilter means such that the pressurized cleaning fluid is sprayed along the entire height of the microfilter means to thereby remove the in fluctuated impurity particles from the microfilter means as the rotary nozzles rotate to spray the entire area of the microfilter means, and
withdrawing the liquid effluent, now filtered, from the annular container.

11. The method of claim 10 wherein the particulate filter particles are recirculated by means of a mammoth pump, said mammoth pump being driven by compressed air supplied pulsatingly thereto, whereas said filter particles supplied to the mammoth pump form a whirling bed by a mixing action of the liquid therewith.

12. The method of claim 11 wherein the liquid mixed with the particulate filter particles is comprised of the pressurized cleaning fluid which cleans the microfilter means.

13. The method of claim 11 wherein a whirling bed is formed of said filter particles by mixing a liquid therewith, after which the filter particles are recirculated by means of a mammoth pump, said mammoth pump being driven by compressed air supplied pulsatingly thereto.

14. The method of claim 13 wherein the liquid mixed with the particulate filter particles includes the pressurized cleaning fluid which falls through the chamber after cleaning the microfilter means.

15. The method of claim 10 wherein the pressurized cleaning fluid used in the step of cleaning is supplied to rotary nozzles supported at a top end of the inner cylindrical section, said rotary nozzles having lengths to extend along the height of the microfilter means such that the pressurized cleaning fluid is sprayed along the entire height of the microfilter means, said rotary nozzles rotating to spray the entire area of the microfilter means.

16. A method for a continuous filtration of a liquid effluent, comprising the steps of:
supplying the effluent to a top end of an enclosed container, said container being divided into an inner cylindrical section and an outer-annular section by a permeable coaxial inner cylindrical wall;
forming a continuously recirculating filter bed in the outer-annular section of the container, said filter bed comprised of particulate filter particles supplied to a top end of the outer-annular section, said filter particles allowed to fall through the outer-annular section, to be then resupplied to the top end of the outer-annular section;
positioning a microfilter means to extend about and to be supported by the permeable coaxial inner cylindrical wall, said microfilter means having a mesh width of ten to two hundred microns, wherein said microfilter means filters the effluent of floculated impurity particles, and allows the effluent to pass through the permeable coaxial inner cylindrical wall and traversely to the outer-annular section with the recirculating filter bed formed thereat to be further filtered thereby;
cleaning said microfilter means by spraying a pressurized cleaning fluid onto the microfilter means to remove the floculated impurity particles from the microfilter means; and
withdrawing the liquid effluent, now filtered, from the container.

* * * * *